(12) United States Patent
Ouzounis et al.

(10) Patent No.: US 10,515,272 B2
(45) Date of Patent: Dec. 24, 2019

(54) MUDDY WATER DETECTION USING NORMALIZED SEMANTIC LAYERS

(71) Applicant: DigitalGlobe, Inc., Longmont, CO (US)

(72) Inventors: Georgios Ouzounis, Longmont, CO (US); Kostas Stamatiou, Longmont, CO (US)

(73) Assignee: DigitalGlobe, Inc., Longmont, CO (US)

( * ) Notice: Subject to any disclaimer, the term of this patent is extended or adjusted under 35 U.S.C. 154(b) by 29 days.

(21) Appl. No.: 15/694,353

(22) Filed: Sep. 1, 2017

(65) Prior Publication Data

US 2018/0330488 A1 Nov. 15, 2018

Related U.S. Application Data

(60) Provisional application No. 62/505,074, filed on May 11, 2017.

(51) Int. Cl.
| | |
|---|---|
| *G06T 7/00* | (2017.01) |
| *G06K 9/00* | (2006.01) |
| *G06K 9/62* | (2006.01) |
| *G06T 7/90* | (2017.01) |
| *G06F 16/583* | (2019.01) |
| *G06T 7/12* | (2017.01) |
| *G06T 7/11* | (2017.01) |
| *G06K 9/40* | (2006.01) |

(52) U.S. Cl.
CPC ....... *G06K 9/0063* (2013.01); *G06F 16/5854* (2019.01); *G06K 9/00637* (2013.01); *G06K 9/627* (2013.01); *G06K 9/6215* (2013.01); *G06K 9/6219* (2013.01); *G06K 9/6221* (2013.01); *G06K 9/6242* (2013.01); *G06K 9/6267* (2013.01); *G06K 9/6282* (2013.01); *G06T 7/0002* (2013.01); *G06T 7/0004* (2013.01); *G06T 7/11* (2017.01); *G06T 7/12* (2017.01); *G06T 7/90* (2017.01); *G06K 9/40* (2013.01); *G06T 2207/10024* (2013.01); *G06T 2207/10036* (2013.01); *G06T 2207/30181* (2013.01); *G06T 2207/30184* (2013.01); *G06T 2207/30188* (2013.01)

(58) Field of Classification Search
CPC ....... G06T 7/0004; G06T 7/0002; G06T 7/12; G06T 7/90; G06T 2207/30181; G06F 17/30259; G06K 9/00637; G06K 9/6219; G06K 9/6215; G06K 9/6282; G06K 9/627; G06K 9/6267
See application file for complete search history.

(56) References Cited

U.S. PATENT DOCUMENTS

| | | | | |
|---|---|---|---|---|
| 2012/0007979 | A1* | 1/2012 | Schneider | G01J 3/36 348/116 |
| 2014/0119639 | A1* | 5/2014 | Shah | G06K 9/0063 382/154 |
| 2017/0213109 | A1* | 7/2017 | Moody | G06K 9/6267 |
| 2018/0239991 | A1* | 8/2018 | Weller | G06K 9/0063 |

* cited by examiner

*Primary Examiner* — Yon J Couso
(74) *Attorney, Agent, or Firm* — Brian R. Galvin; Galvin Patent Law, LLC

(57) ABSTRACT

A system and methods for muddy water detection using normalized semantic layers, wherein a spectrum analyzer isolates spectrum bands within an image to produce a set of three normalized differential index images from which a composite color image is created, from which a power band is computed, from which a two-color image is produced, and then filters image components within the two-color representation based on defined criteria.

2 Claims, 10 Drawing Sheets

MUDDY WATER DETECTION USING NORMALIZED SEMANTIC LAYERS

CROSS-REFERENCE TO RELATED APPLICATIONS

This application claims the benefit of, and priority to, U.S. provisional patent application Ser. No. 62/505,074, filed on May 11, 2017 and title, "SHAPE-BASED SEGMENTATION USING HIERARCHICAL IMAGE REPRESENTATIONS FOR AUTOMATIC TRAINING DATA GENERATION AND SEARCH SPACE SPECIFICATION FOR MACHINE LEARNING ALGORITHMS", the entire specification of which is incorporated herein by reference in its entirety.

BACKGROUND

Field of the Art

The disclosure relates to the field of image processing, and more particularly to the field of detecting regions covered by muddy water within an image.

Discussion of the State of the Art

Identifying regions covered by muddy water in satellite imagery using LANDSAT data tends to yield low-resolution and inaccurate results, often underestimating the size of muddy water-covered regions by a large margin. Due to varying particle composition and concentration in muddy water, there is no unique radiometric signature that can be utilized for simple identification, requiring the use of more involved image analysis. Other techniques have been attempted, in the art, for example the use of synthetic aperture radar or LIDAR to detect areas affected by floods. For example, Mason, et. al describe such a method in their paper, "*Near real-time flood detection in urban and rural areas using high resolution Synthetic Aperture Radar images*", published in *IEEE Transactions on Geoscience and Remote Sensing*, 50 (8). pp. 3041-3052 (2012); this method for example suffers from the requirement that a synthetic aperture radar-equipped satellite must be used, which limits its applicability substantially.

What is needed, therefore, is an unsupervised means to reliably identify regions covered by muddy water with more accurate extent, using readily available satellite or aerial imagery.

SUMMARY

Accordingly, the inventor has conceived and reduced to practice, a system and methods for muddy water detection using normalized semantic layers.

According to one aspect, a system for muddy water detection using normalized semantic layers, comprising: a spectrum analyzer comprising a processor, a memory, and a plurality of programming instructions stored in the memory and operating on the processor, wherein the programming instructions, when operating on the processor, cause the processor to: receive an image from an image source; isolate a plurality of spectrum bands from the image information; normalize at least a portion of the plurality of spectrum bands by scaling the pixel values within the band; produce a composite image based at least in part on the normalized spectrum bands; a filtering engine comprising a processor, a memory, and a plurality of programming instructions stored in the memory and operating on the processor, wherein the programming instructions, when operating on the processor, cause the processor to: receive a composite image from the spectrum analyzer; apply a plurality of filters to the composite image to isolate a power band, the power band being based at least in part on the relative contribution of a single spectrum band relative to the rest of the spectrum bands; produce a greyscale image based at least in part on the power band; normalize the greyscale image to produce a two-color image; and algorithmically filter components within the two-color image, is disclosed.

According to another aspect, a method for muddy water detection using normalized semantic layers, comprising the steps of: receiving, at a spectral analyzer, an image from an image source; isolating a plurality of spectrum bands within the image information; normalizing the spectrum bands; producing a composite image based at least in part on the normalized spectrum bands; isolating, using a filtering engine, a power band within the composite image; producing a greyscale image based at least in part on the power band; normalizing the greyscale image to produce a two-color image; and algorithmically filtering image components within the two-color image, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
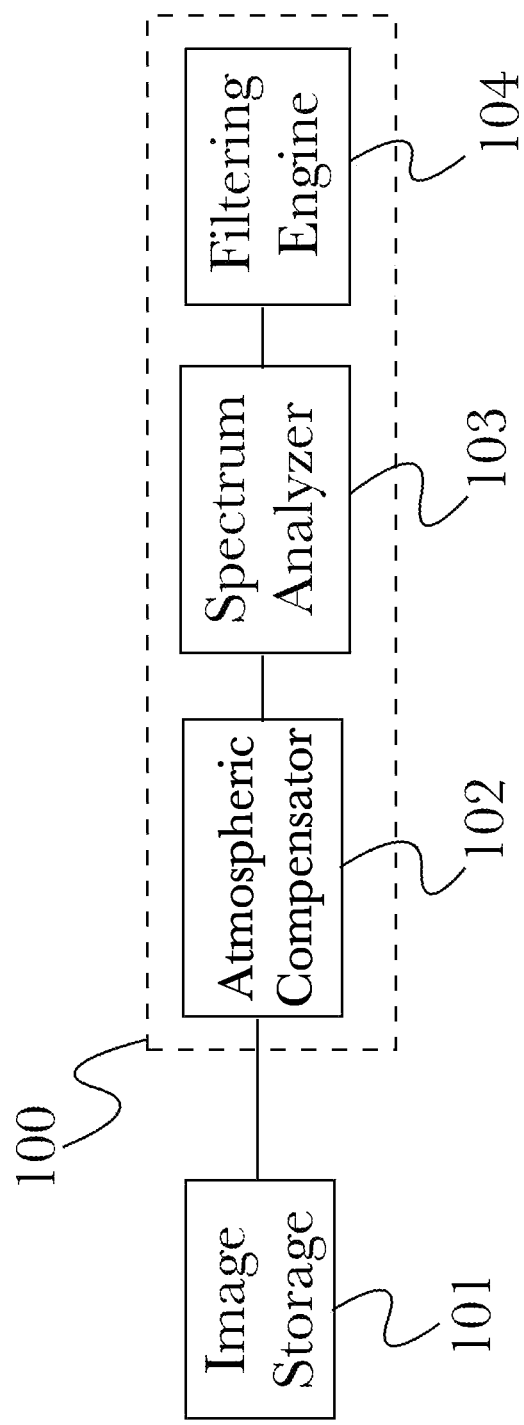
FIG. 1 is a block diagram illustrating an exemplary system architecture for muddy water detection using normalized semantic layers, according to one aspect.

The inventor has conceived, and reduced to practice, a system and methods for muddy water detection using normalized semantic layers.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for muddy water detection using normalized semantic layers, according to one aspect. According to the aspect, an image source 101 may comprise an imaging satellite, image database, or other data store, a user's computing device uploading images via a network, local storage such as a hard drive or other removable file storage device, or any other device or service that may store, provide, produce, or transmit image information. Images may be retrieved from a storage 101 individually or in any quantity in a single retrieval operation, such as to retrieve a set of images matching a metadata tag or within a specific timeframe. Images may also be received passively, such as streaming in real-time directly from an image source (that is, receiving an image immediately when the image is created) such as an imaging satellite or when uploaded by a user for use. Generally, according to various aspects images obtained from image source 101 are passed to an atmospheric compensation module 102, which corrects each image by eliminating effects from clouds, haze, and other atmospheric effects, so that each image has an colorimetrically-accurate representation of conditions on the ground. Atmospheric compensation may be performed, for example, using techniques disclosed in co-owned U.S. Pat. No. 9,001,311, titled "USING PARALLAX IN REMOTE SENSING TO DETERMINE CLOUD FEATURE HEIGHT", which was filed on Mar. 15, 2013 (the entire specification of which is incorporated herein by reference) and in co-owned U.S. Pat. No. 9,396,528, titled "ATMOSPHERIC COMPENSATION IN SATELLITE IMAGERY" which was filed on Mar. 15, 2013 (the entire specification of which is incorporated herein by reference). Images may then be passed to a spectrum analyzer 103 that may receive a multispectral image comprising at least an infrared (IR) and at least one visible spectral band. Images may also comprise any number of additional spectral bands, such as 4-, 6-, or 7-band imagery as is commonly collected by satellites according to their particular design or use case, and any given additional band may comprise ay arbitrary portion of the RF spectrum and need not necessarily be visible light (for example, a satellite may record an image with a single visible spectrum band, an IR band, and an X-ray band). Additionally, the IR band may comprise a subset of the IR portion of the EM spectrum, for example comprising specifically near-infrared (NIR) spectral data. Spectrum analyzer 103 may then compute frequency and power band information from the image information, which may then be simplified (turned into a simple two-color image) and labeled and filtered by a filtering engine 104 to remove noise and unwanted information from the newly-refined data to produce normalized image information as output. The power band may be obtained by multiplying a selected band (for muddy water, for example, this may be the red band of a synthetic RGB image generated as described below) by a variable (usually the number of bands in the image −1) and then subtracting the sum of the other bands.

Detailed Description of Exemplary Aspects

Figure 2:
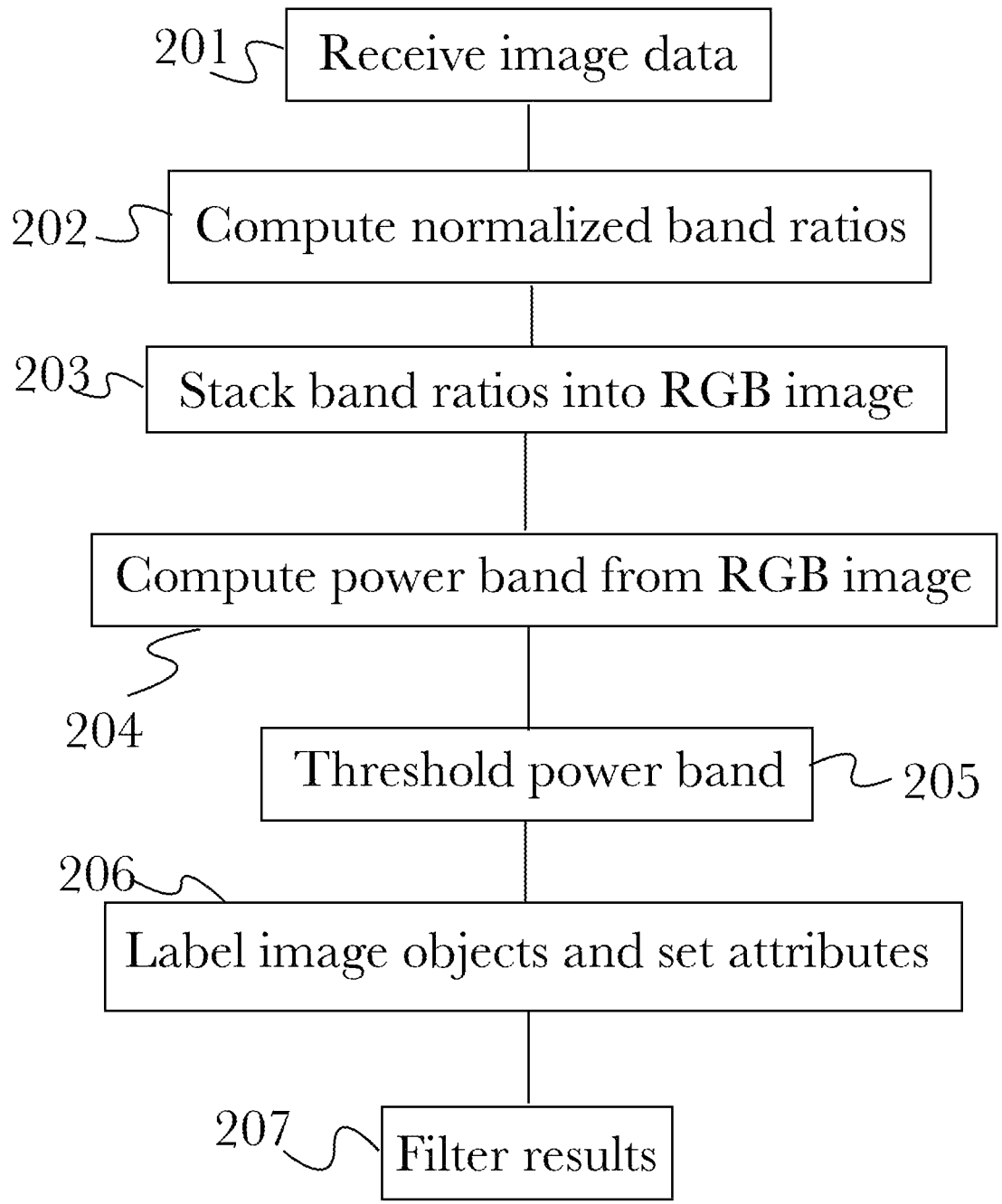
FIG. 2 is a flow diagram illustrating an exemplary method for muddy water detection using normalized semantic layers, according to one aspect.

FIG. 2 is a flow diagram illustrating an exemplary method 200 for muddy water detection using normalized semantic layers, according to one aspect. In an initial step 201, a spectrum analyzer 103 receives image data from an image source 101 such as a database or imaging satellite, and then computes, in step 202, a plurality of normalized band ratios for the spectral information in the image data, rescaling them to fit within a range of [0,255] as needed, and representing them as RGB image data regardless of the original spectral range in the image data, allowing the use of normalized RGB band ratios to represent any spectral information as needed. These band ratios may then, in step 203, be stacked into a single RGB image comprising the normalized RGB data and providing an RGB visual representation of the original image information, and then the power band corresponding to water (that is, defined RGB values that describe water pixels within the image) may be computed in step 204 from the RGB image data. The spectral band of interest, or power band, may then be identified by multiplying a desired RGB band by a constant (such as for example the red band) by a constant (such as for example the number of other bands present in the image), and then removing the remaining bands to leave only the contribution of the selected band (in this example, the red band); that is, for n bands, the power band is the selected RGB band multiplied by n−1 and then the sum of all others is subtracted from the result), leaving the multiplied power band and stripping undesired data, and constrained to fit a threshold in step 205 set according to the desired range of water or moisture concentration. The power band may then be passed to a filtering engine 104 to label image objects (such as bodies of water) 206 and assign attribute values such as (for example, including but not limited to) size or width. In a final step 207, noise and unwanted image information may be filtered from the image data using the assigned attribute values, for example to remove actual image artifacts or noise as well as clearly unwanted image objects such as buildings or vegetation (or any other object that may be identified using the available image information).

Figure 3:
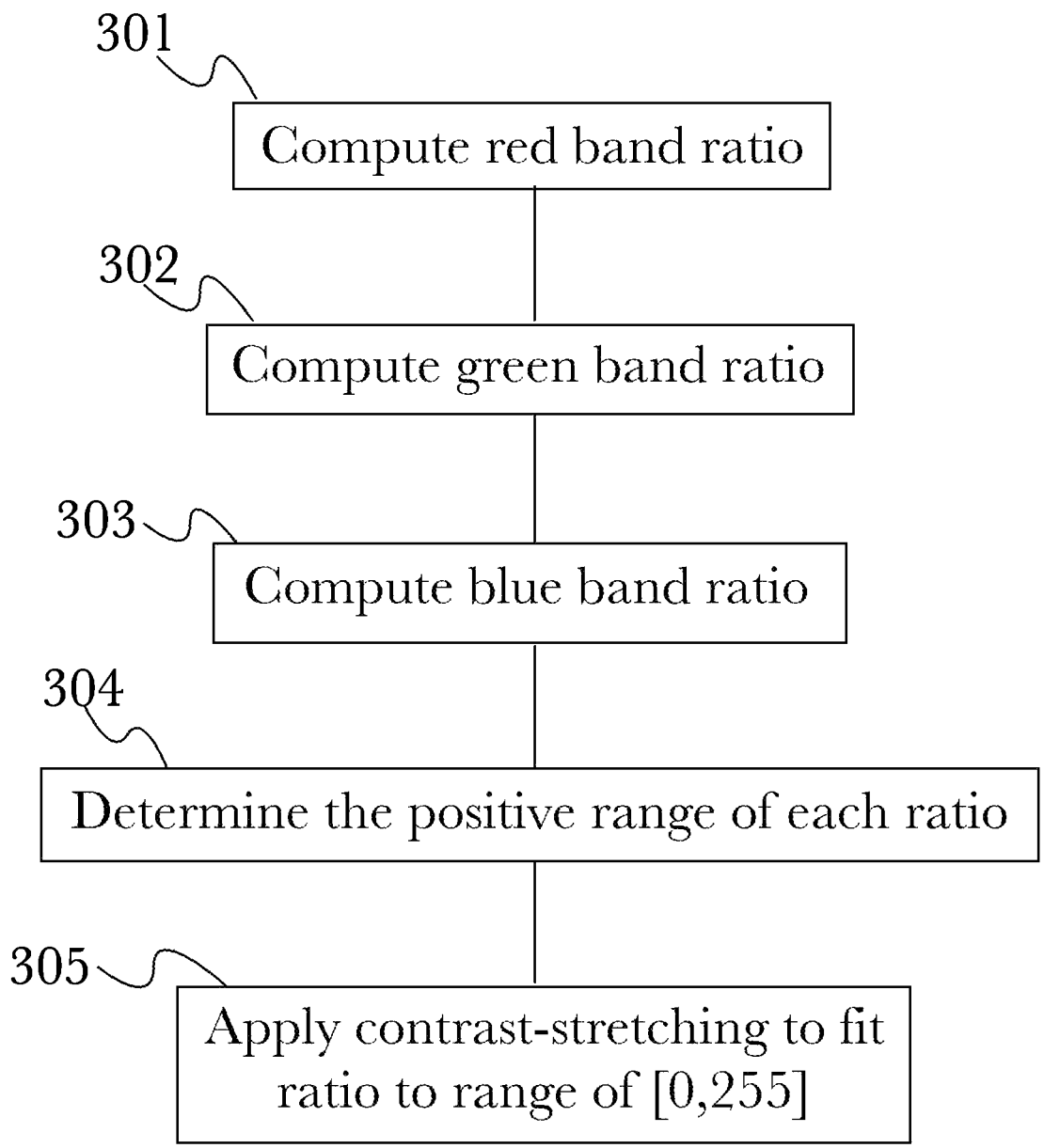
FIG. 3 is a flow diagram illustrating an exemplary method for creating a synthetic image based on semantic layers, according to one aspect.

FIG. 3 is a flow diagram illustrating an exemplary method 300 for creating a synthetic image based on semantic layers, according to one aspect. According to the aspect, RGB values may be normalized by first computing a red ratio for pixels in an image 301 by computing (R−NIR)/(R+NIR) to isolate red pixel data. This process may be repeated for green 302 and blue 303 color information (as (G−NIR)/(G+NIR) and (B−NIR)/(B+NIR), respectively). These color ratios may then be checked individually to identify the range of positive values present within each color band 304, and the range may then be normalized 305 by applying contrast stretching to expand the values to fill a desired range, for example a 256-bit range of [0,255].

Figure 3A:
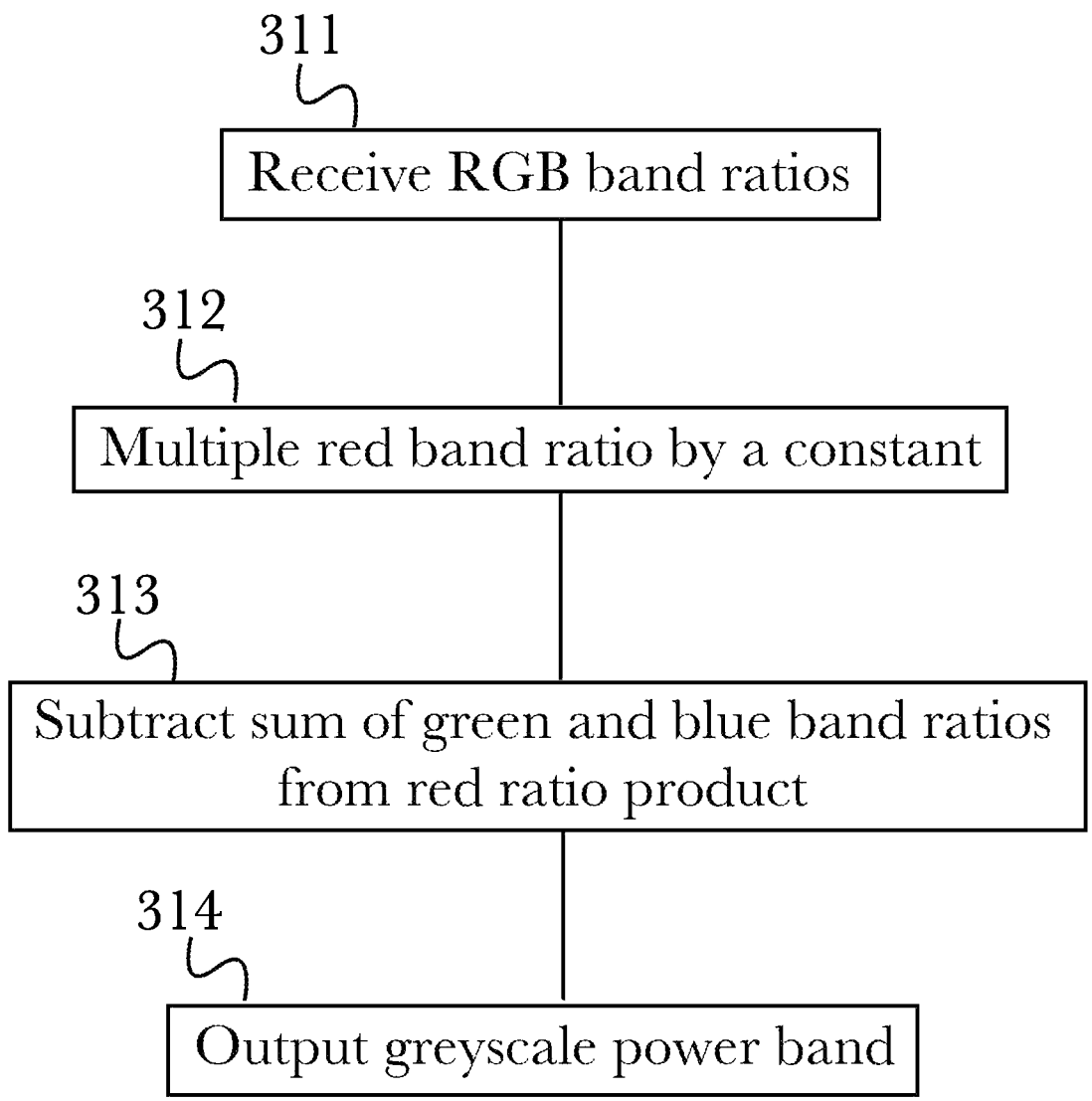
FIG. 3A is a flow diagram illustrating an exemplary method for producing a power band, according to one aspect.

FIG. 3A is a flow diagram illustrating an exemplary method 310 for producing a power band, according to one aspect. In an initial step 311, the band ratios for red, green, and blue may be received for use in producing a power band for further use in muddy water detection. In a next step 312, a red band ratio may be multiplied by a configured constant value. In a next step 313, the received green and blue band ratios may be added together, and their sum then subtracted from the product of the red band ratio and constant produced in step 312. This results in an output of a greyscale power band 314 based on the RGB band ratios. It should be appreciated that different spectral bands may be used to produce a power band according to a particular use case, and the use of red, green, and blue bands and band ratios is merely exemplary.

Figure 4:
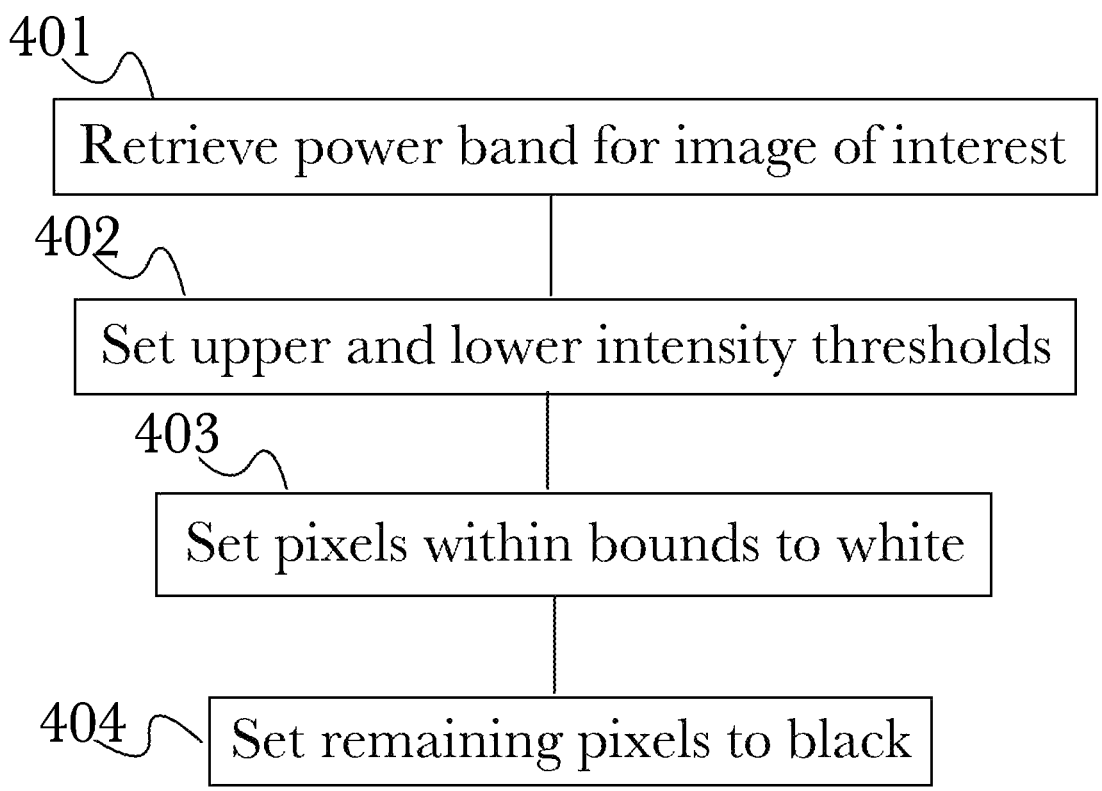
FIG. 4 is a flow diagram illustrating an exemplary method for generating a two-color image from a power band, according to one aspect.

FIG. 4 is a flow diagram illustrating an exemplary method 400 for generating a two-color image from the power band described before, according to one aspect. According to the aspect, a power band, which may be extracted from the synthetic RGB image information produced by a spectral analyzer (as described previously in FIG. 3) is retrieved in step 401. A set of thresholds may then be defined in step 402, setting upper and lower limits for pixel intensity, and then all pixels that fall within the defined intensity windows may be set to white in step 403, while all remaining pixels outside the bounds are set to black in step 404.

Figure 5:
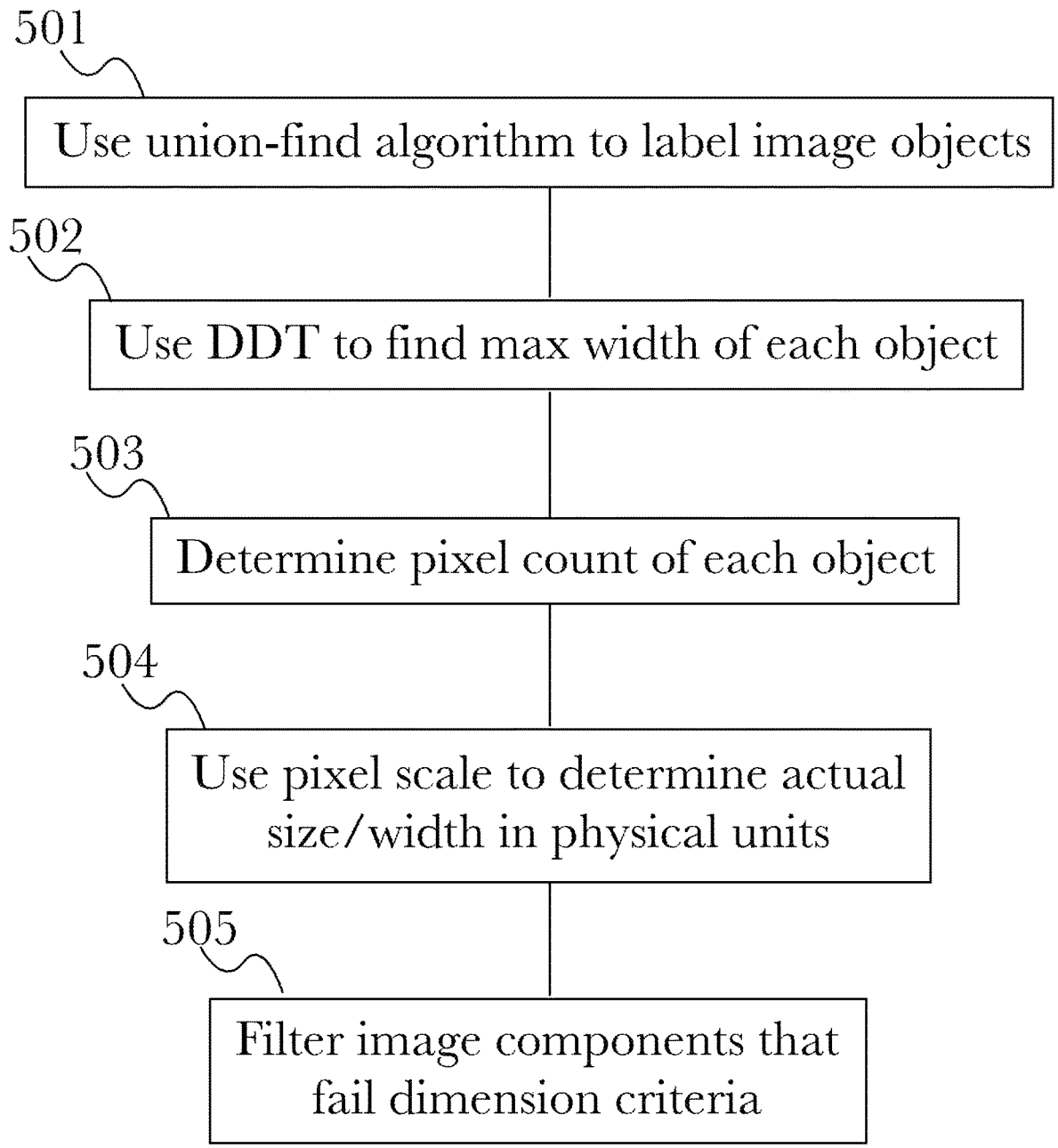
FIG. 5 is a flow diagram illustrating an exemplary method for selecting features corresponding to flooded regions from an image, according to one aspect.

FIG. 5 is a flow diagram illustrating an exemplary method 500 for selecting features corresponding to flooded regions from an image, according to one aspect. According to the aspect, a two-color image produced by as described previously in FIG. 4 may be filtered to remove unwanted components by first, in step, 501 applying a union-find algorithm to the image data, which assigns unique labels to each disjoint set (i.e., each feature) in the two-color image. Then, a discrete distance transform (DDT) algorithm may be applied in step 502 to attribute a width profile to each labeled component. Further, in step 503, a pixel count of each component may be used to generate a "size" attribute to each component; now each feature has a width and a size parameter available. In step 504, the width and size parameters (which would be in units of pixels in both cases) may be converted to physical units appropriately by applying a scale factor determined by image metadata (typically, pixel resolution in meters). For example, if pixel resolution of an image is 0.5 meters and a feature has width of 4 pixels and size of 300 pixels, then it would be converted in step 504 to a width of 2 m and a size of 300 m². Lastly, in step 505, all components that fail to meet defined attribute criteria such as size or width (being too small or too large, for example) are removed, leaving the filtered results that comprise only the regions of muddy water desired, that have now been isolated from the initial image. For example, the width profiles may be used to filter out objects based on their width properties if they are too thin, since they could be roads rather than flooded regions.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 6:
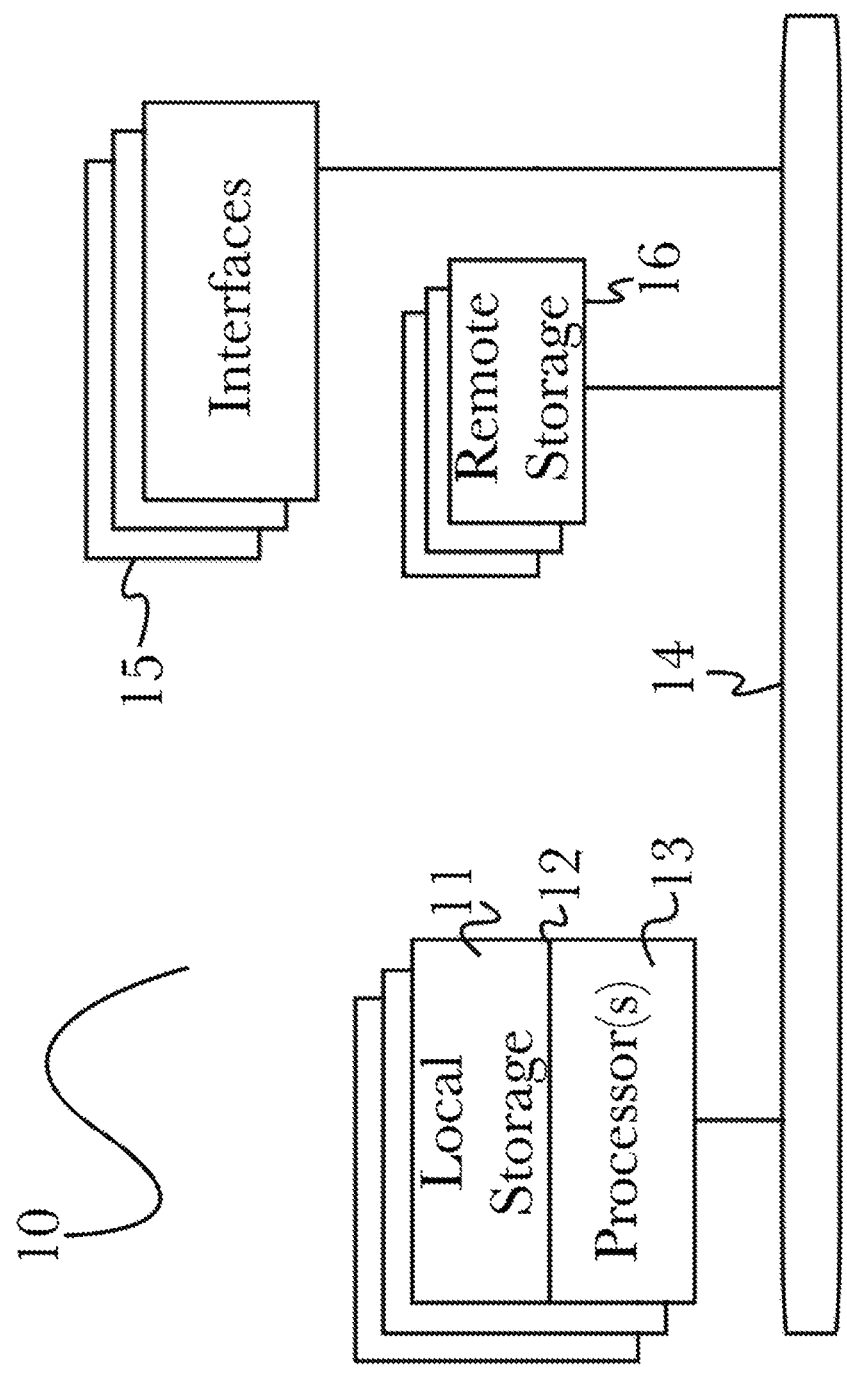
FIG. 6 is a block diagram illustrating an exemplary hardware architecture of a computing device.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
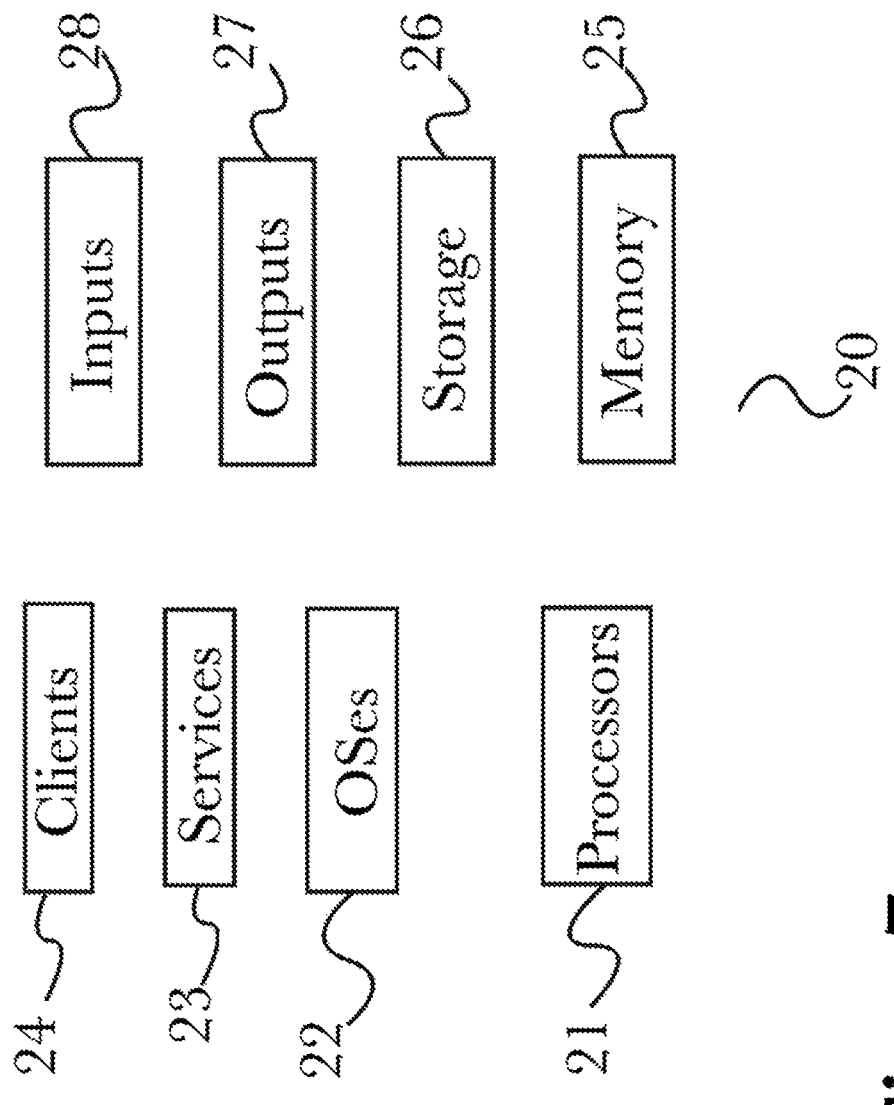
FIG. 7 is a block diagram illustrating an exemplary logical architecture for a client device.

In some aspects, systems may be implemented on a standalone computing system. Referring now to FIG. 7, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
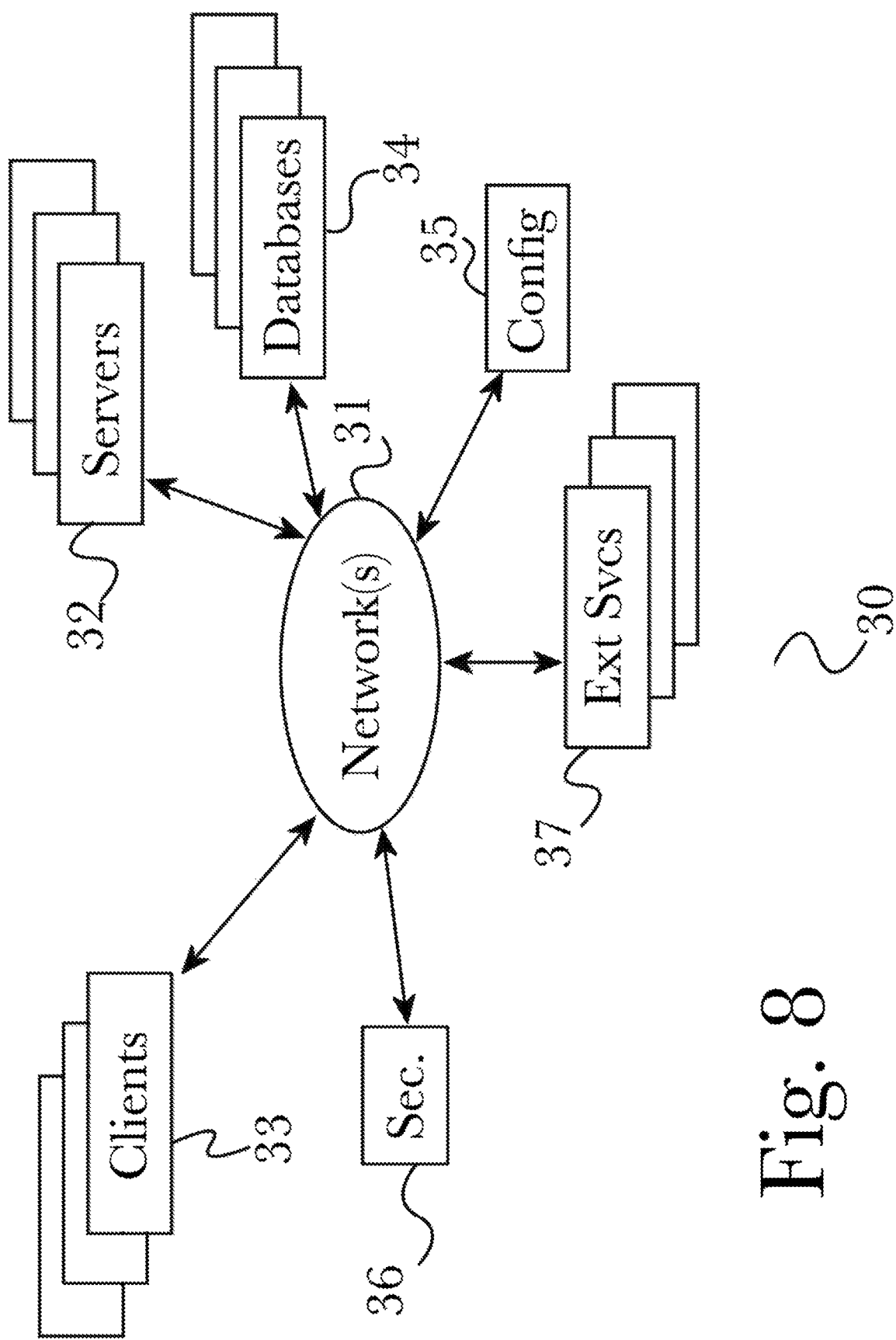
FIG. 8 is a block diagram showing an exemplary architectural arrangement of clients, servers, and external services.

In some aspects, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 9:
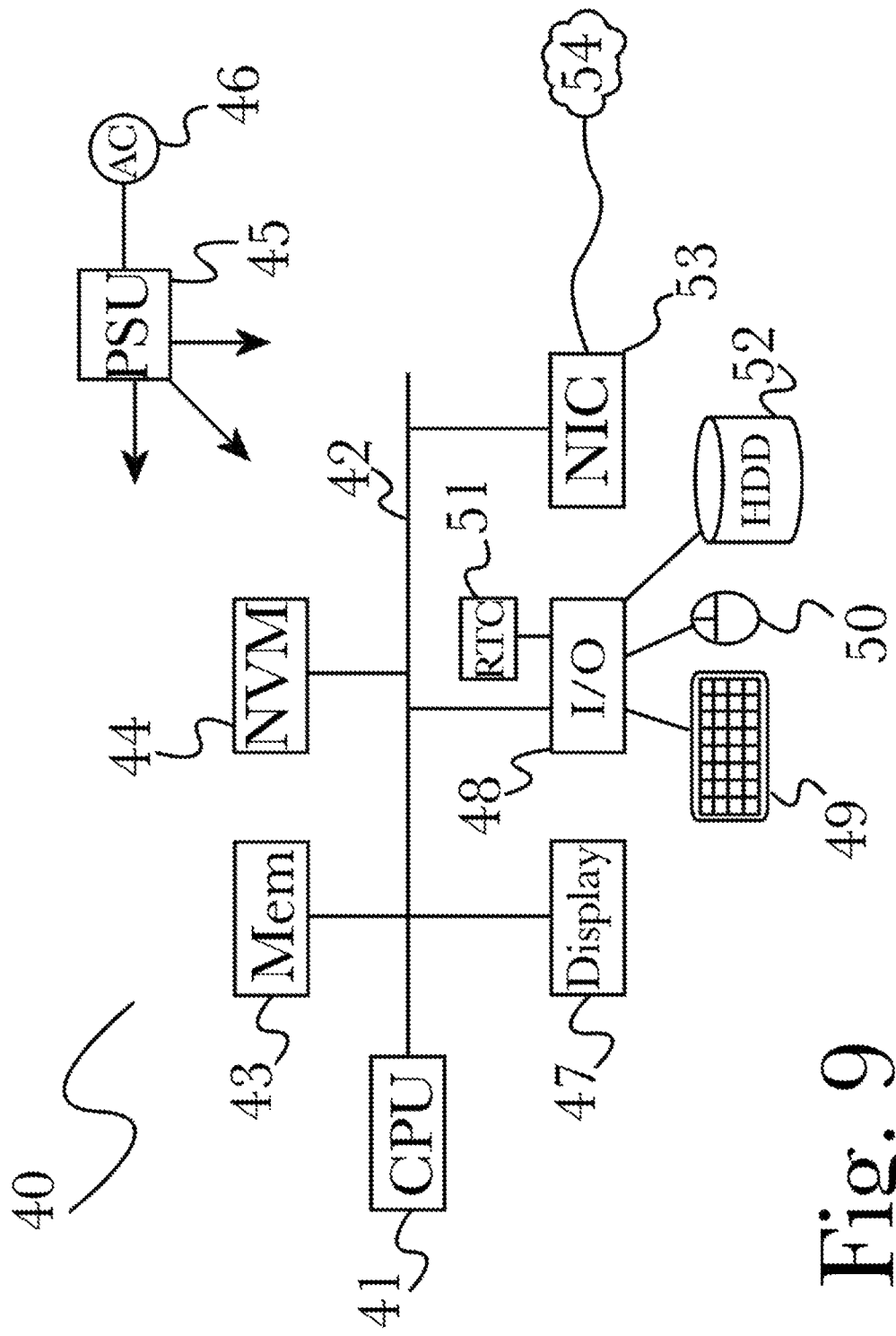
FIG. 9 is another block diagram illustrating an exemplary hardware architecture of a computing device.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for muddy water detection in an image using normalized spectra bands, comprising:
 a spectrum analyzer comprising a processor, a memory, and a plurality of programming instructions stored in the memory and operating on the processor, wherein the programming instructions, when operating on the processor, cause the processor to:
  receive an image from an image source;
  isolate a plurality of spectrum bands from the image;
  normalize at least a portion of the plurality of spectrum bands by scaling the pixel values within the band;
  produce a composite image based at least in part on the normalized spectrum bands;
 a filtering engine comprising a processor, a memory, and a plurality of programming instructions stored in the memory and operating on the processor, wherein the programming instructions, when operating on the processor, cause the processor to:
  receive the composite image from the spectrum analyzer;
  apply a plurality of filters to the composite image to isolate a power band, the power band being based at least in part on the relative contribution of a single spectrum band relative to the rest of the spectrum bands;
  produce a greyscale image based at least in part on the power band;
  normalize the greyscale image to produce a two-color image; and
  filter components within the two-color image.

2. A method for muddy water detection in an image using normalized spectral bands, comprising the steps of:
 receiving, at a spectrum analyzer, an image from an image source;
 isolating a plurality of spectrum bands within the image;
 normalizing the spectrum bands;
 producing a composite image based at least in part on the normalized spectrum bands;
 isolating, using a filtering engine, a power band within the composite image;
 producing a greyscale image based at least in part on the power band;
 normalizing the greyscale image to produce a two-color image; and
 filtering image components within the two-color image.

* * * * *